Oct. 21, 1924.
B. A. REYNOLDS
WATER TEMPERATURE REGULATOR
Filed Feb. 29, 1924
1,512,713
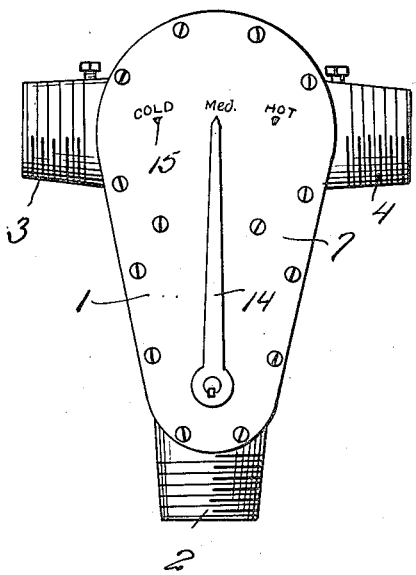
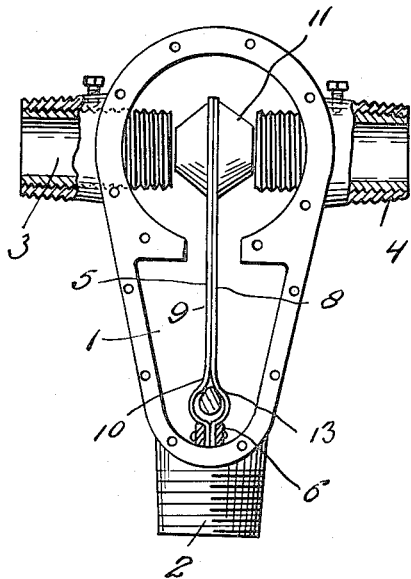
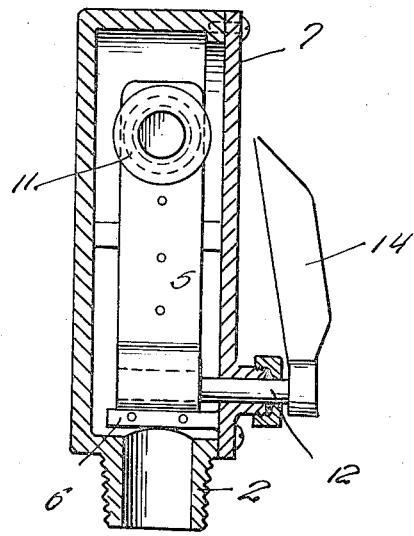
B. A. Reynolds
Inventor
By Clarence A. O'Brien
Attorney Patented Oct. 21, 1924.

1,512,713

UNITED STATES PATENT OFFICE.

BURL A. REYNOLDS, OF TOPEKA, KANSAS.

WATER-TEMPERATURE REGULATOR.

Application filed February 29, 1924. Serial No. 696,110.

*To all whom it may concern:*

Be it known that I, BURL A. REYNOLDS, a citizen of the United States, residing at Topeka, in the county of Shawnee and State of Kansas, have invented certain new and useful Improvements in Water-Temperature Regulators, of which the following is a specification.

This invention relates to water temperature regulators and it consists in the novel features hereinafter described and claimed.

An object of the invention is to provide a device of the character stated which may automatically regulate the temperature of liquids or water passing through it and coming out of the body thereof at a common outlet.

A further object of the invention is to provide means upon the body of the temperature regulator for indicating approximately the temperature of the mixed streams of liquid and as the mixture leaves the body.

The device is intended primarily to be used in connection with the hot water inlet and cold water inlet of service pipes leading from sources of cold and hot water supply and connected with the body of the device. The device is one of convenience and service in barber shops, hotels, kitchens, baths or other places where it is desired to regulate the temperature of water. The parts and features are so arranged and assembled that mixed hot and cold water may be obtained and should it be desired hot or cold water only may be obtained.

With these objects in view, the structure comprises a casing having water supply nipples leading into the same and disposed at opposite sides thereof. A vane is mounted within the casing and is composed of two sheets of metal of different character. One sheet of metal may be of such character or nature as to respond, that is to say flex or bend, readily when subjected to hot or warm water and the other sheet of metal may be of such character or nature as not to be affected materially by the temperature of the water. Valve members are carried upon the free end of the vane and may move toward and away from the ends of the nipples as the said vane is flexed or bent by the temperature of the water acting upon that sheet of the vane which responds to variations in the temperature of the water. A shaft is journalled in the casing and is provided with an eccentric portion adapted to engage the vane and swing the same so that the valves may be initially spaced at desired distances from the ends of the nipples. An indicating pointer is carried by the shaft and may be moved over graduations provided upon the casing to set the vane in order to produce a mixture having a temperature approximately corresponding with that indicated in the casing at the point at which the indicator finger is set.

In the accompanying drawing:—

Figure 1 is a side elevation of the water temperature regulator.

Figure 2 is a similar view with parts removed and parts shown in section.

Figure 3 is a transverse sectional view of the water temperature regulator.

The water temperature regulator comprises a substantially pear-shaped body or casing 1 having an outlet opening 2 at its smaller end, a hot water inlet nipple 3 at one side and a cold water inlet nipple 4 at the opposite side. The nipples 3 and 4 may be connected with service pipes in a usual manner. The inner ends of the nipples 3 and 4 are spaced from each other within the body or casing 1. A vane indicated in general at 5, is located within the casing 1 and is mounted upon an arm 6 which is carried by a plate 7 that forms one side of the casing 1. The vane 5 is composed of metallic strips 8 and 9, the said strips being riveted together and provided at points of connection with the arm 6 with outwardly disposed loop sections 10. The strip 8 is opposite the cold water nipple 4 and is composed of a metal which responds promptly to changes in temperature. That is to say, the metal will warp or twist when subjected to high temperature. The strip 9 is composed of metal which is not materially affected by variations in temperature. Therefore the strip 9 will tend to maintain the vane structure 5 straight and when the strip 8 is subjected to variations in temperature, it will have a tendency to bend or warp the vane 5. Valve members 11 are carried at the free end portion of the vane 5 and are disposed opposite the inner ends of the nipples 3 and 4. A shaft 12 passes transversely through the plate 7 and is journalled therein. An eccentric 13 is carried by the shaft 12 and is located in the space between the loops 10 of the strips 8 and 9 of the vane 5. An indicator finger 14 is mounted upon the outer end of the shaft. Indicia 15 are provided upon the exterior surface of the plate 7 and are located under the path of movement of the free end of the indicator finger 14. These indicia represent cold, medium, and hot. When the end of the indicator 14 is moved over the cold index, it signifies that a cold or cool mixture of water will be produced in the temperature regulator. When the end of the indicator finger 14 is disposed over the index "medium," it signifies that the temperature of the mixture which is produced within the regulator will be medium. When the end of the indicator 14 is disposed over the index "hot," it signifies that the temperature of the mixture produced in the regulator will be warm or hot. This is due to the fact that during such movement of the indicator 14, the shaft 12 is turned and the eccentric 13 comes in contact with the inner surfaces of the loops 10 of the strips 8 and 9 and the vane 5 is tilted so that the positions of the valves 11 with relation to the ends of the nipples 3 and 4 is varied and consequently the volumes of water which pass through the said nipples and enter the body is correspondingly varied and as these volumes or streams are of different temperatures, the different temperatures of the mixture obtained within the body will result and as hereinbefore explained.

As shown in the drawing, sleeves are screwed into the nipples 3 and 4. These sleeves are adjustable for the purpose of calibrating the device. The regulating vane 5 is composed of two metallic strips, the strip 8 having a higher coefficient of expansion than the strip 9. The higher the temperature of the liquid surrounding the vane 5, the strip 8 expands faster than the strip 9 and which will warp the vane 5 and thereby partly closing the inlet nipple 3 thus reducing the hot water flow.

Having described the invention, what is claimed is:

In a device of the character described, a vane composed of strips having intermediate loop portions, a casing housing the vane, a shaft journalled in the casing and having an eccentric portion received between the loops, and means for turning the shaft to tilt the vane.

In testimony whereof I affix my signature.

BURL A. REYNOLDS.